(No Model.) 4 Sheets—Sheet 1.
J. G. LETTELIER.
MACHINE FOR MAKING BOX BINDING CHANNEL STRIPS.
No. 482,484. Patented Sept. 13, 1892.
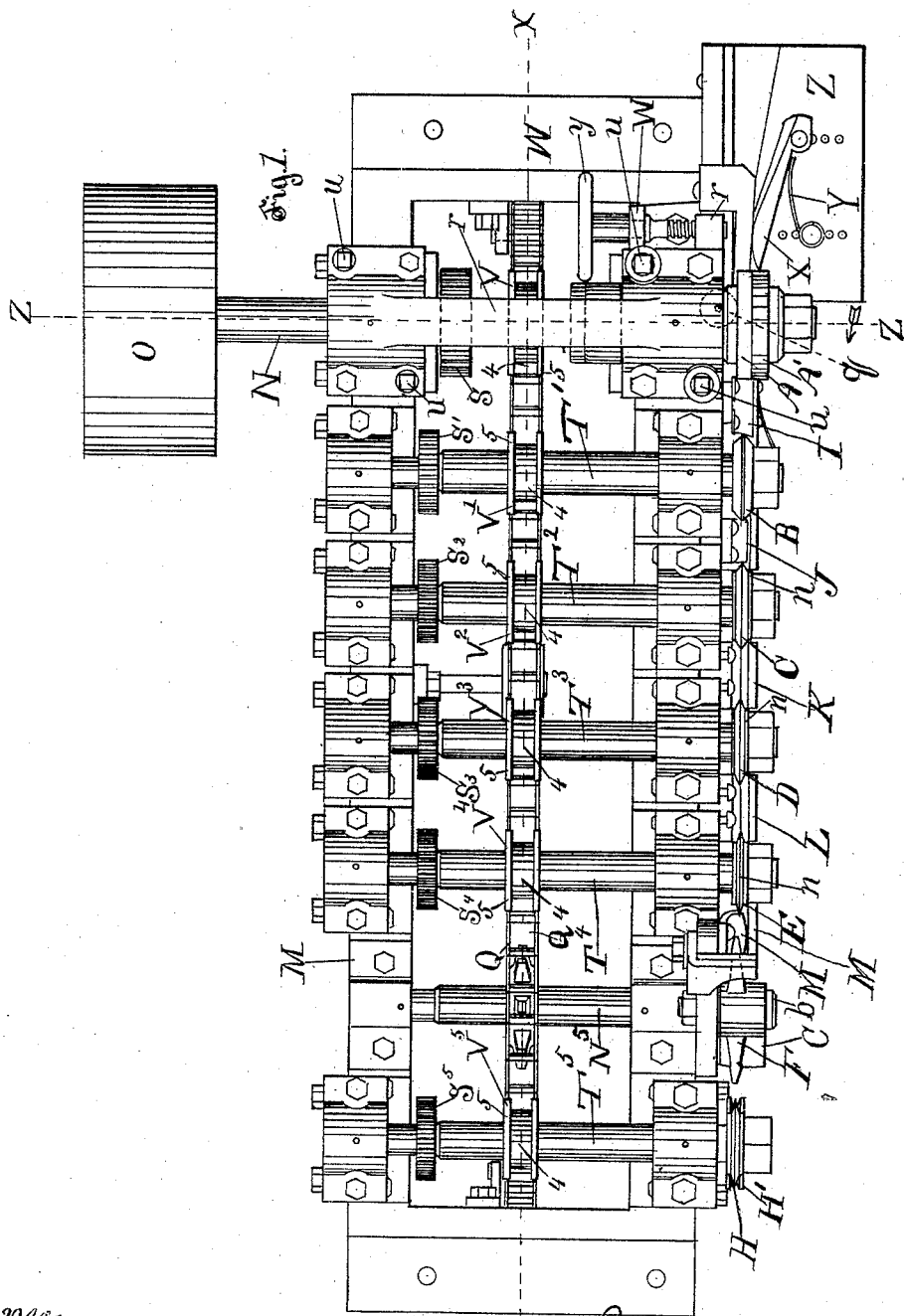
Witnesses.
Inventor.
John G. Lettelier
by Hazard & Townsend
his attys.

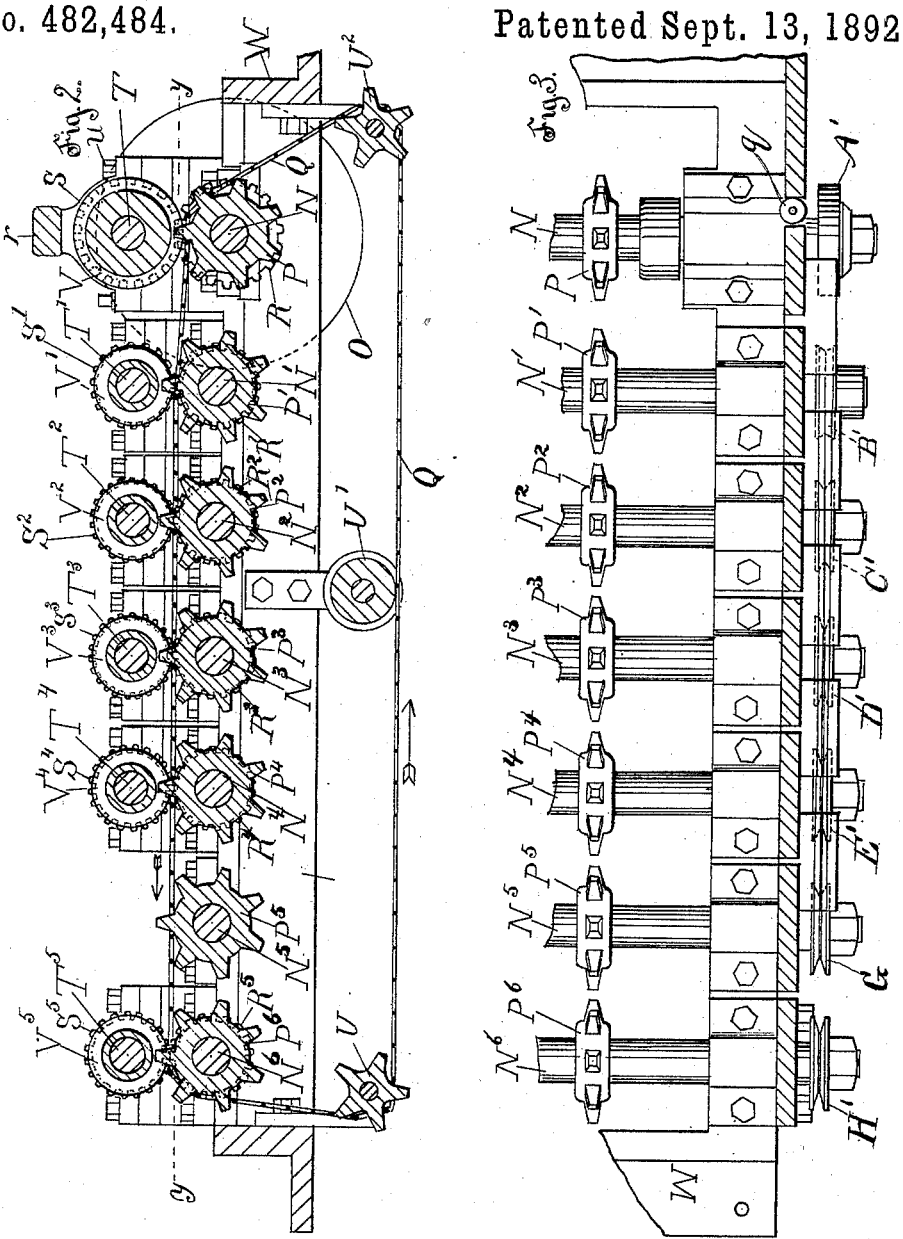

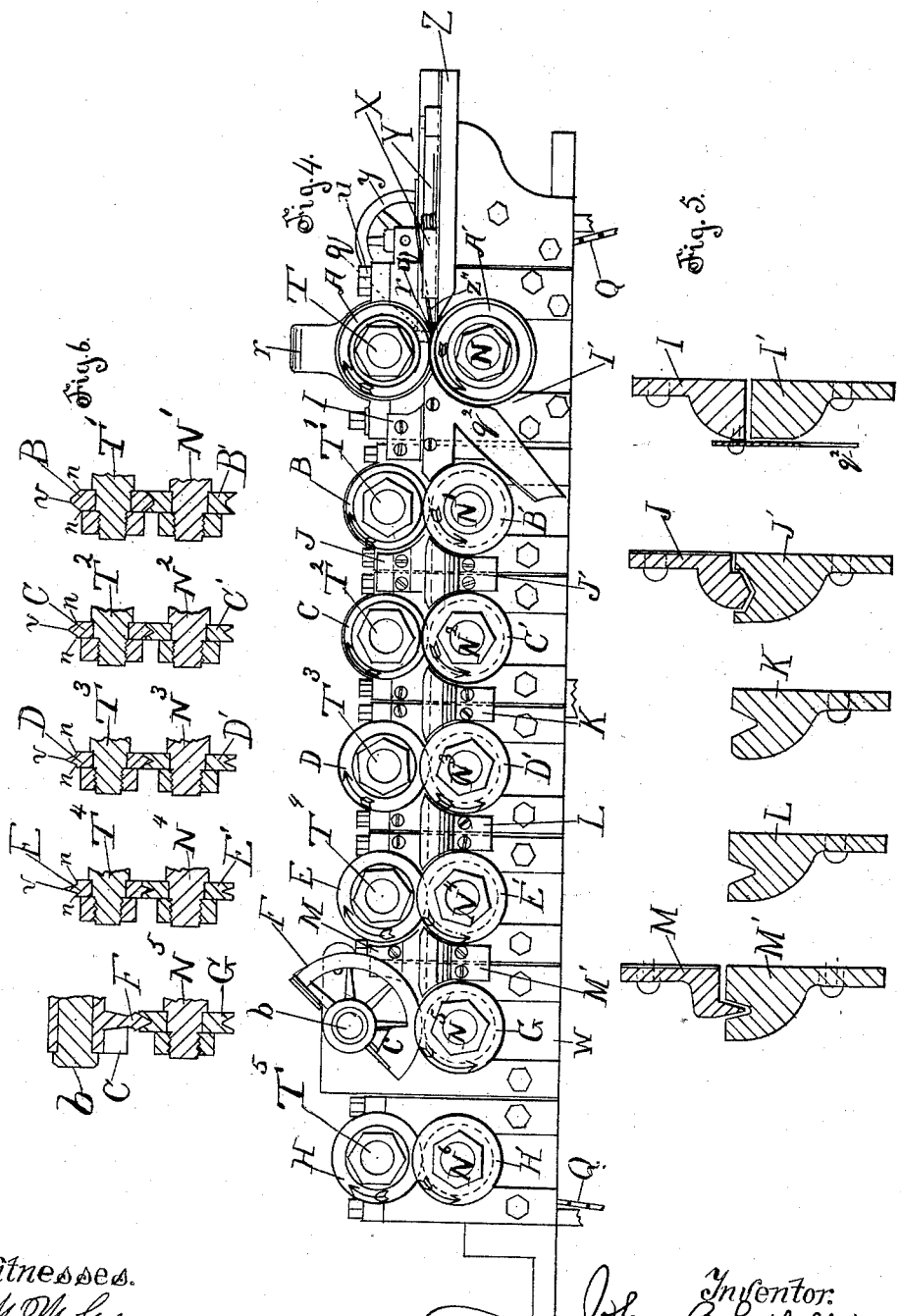

(No Model.) 4 Sheets—Sheet 4.
J. G. LETTELIER.
MACHINE FOR MAKING BOX BINDING CHANNEL STRIPS.
No. 482,484. Patented Sept. 13, 1892.
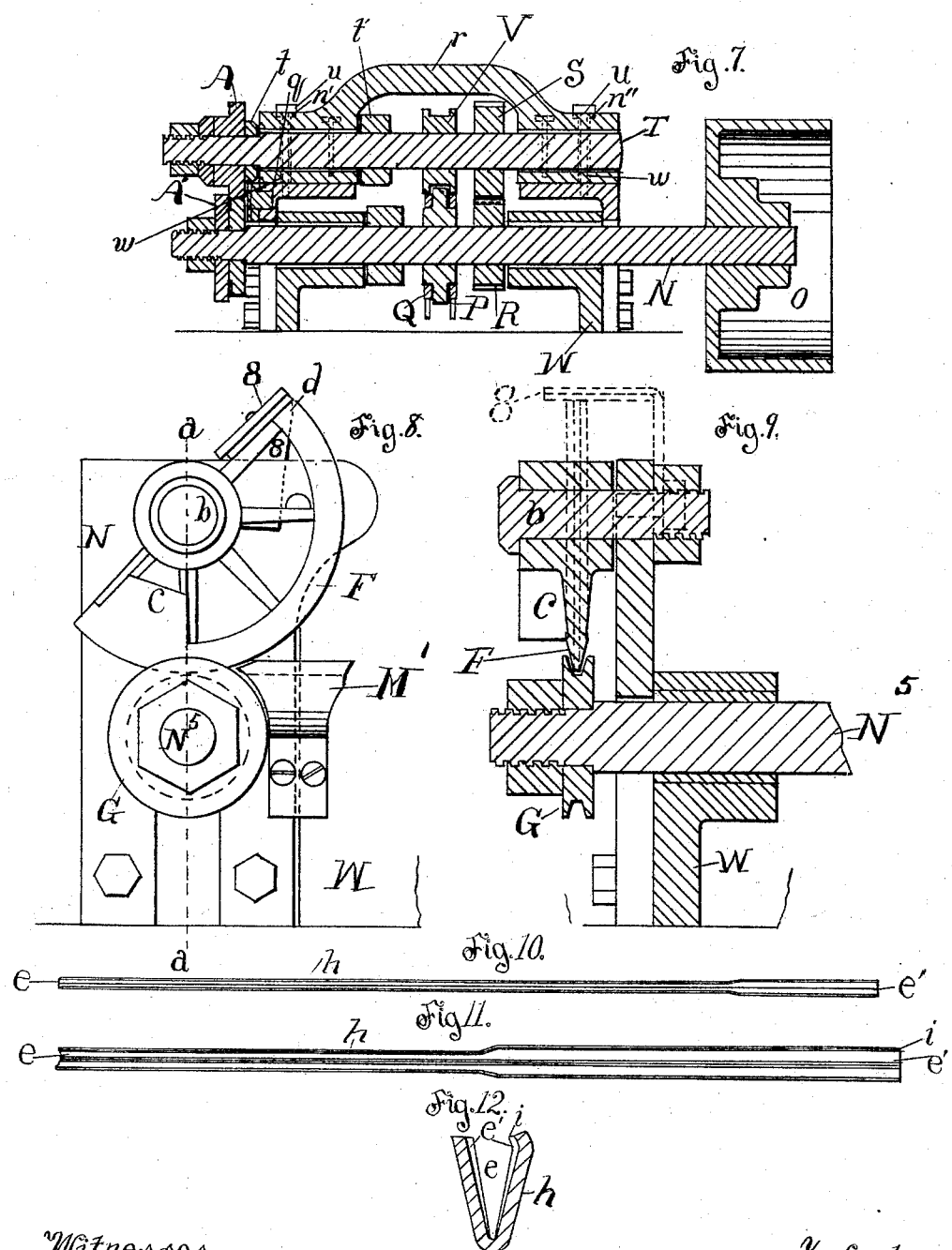

UNITED STATES PATENT OFFICE.

JOHN G. LETTELIER, OF LOS ANGELES, CALIFORNIA.

MACHINE FOR MAKING BOX-BINDING CHANNEL-STRIPS.

SPECIFICATION forming part of Letters Patent No. 482,484, dated September 13, 1892.

Application filed March 28, 1891. Serial No. 386,835. (No model.)

*To all whom it may concern:*

Be it known that I, JOHN G. LETTELIER, a citizen of the United States, residing at Los Angeles, in the county of Los Angeles and State of California, have invented a new and useful Improvement in Machines for Forming Channel-Strips, of which the following is a specification.

My invention relates to machines for forming channel-strips for use in the manufacture of open-topped fruit-baskets. Heretofore it has been customary to form such channel-strips by first cutting the strip of tin to the desired width and then bending the strip into trough or channel shape by a separate machine, which bends the strip uniformly along its entire length at the same time. Machines with rotary shears and formers have been constructed before my invention; but their operation has not been satisfactory, because the shears and formers were situated on shafts which were provided with a bearing upon each side of the shears and formers and the strips of scrap-tin which were cut from the edge of the strip by the shears would become wound about the shafts and necessitate the frequent stopping of the machine to remove them therefrom. My invention differs from these prior machines in that it has its shears and formers mounted upon the outer ends of the shafts, and the inner sides of the shears are arranged close to the frame of the machine, so that there is none of the shaft between the frame and shears for the tin strip to become wound around; also, the space between the cutting-edge of the shears and the frame is made of the width desired for the flat strip out of which the channel-strip is to be formed, so that the scrap-tin cut from the strip is left on the outside of the frame of the machine and drops off as soon as severed from the strip to be formed. My machine differs from prior machines for this purpose in that it is designed to operate upon narrow scraps of tin, which are produced in great quantities in manufacturing tin cans and other articles. It also differs from prior machines in that it is provided with suitable guides for holding the tin in place and for directing the scrap downward and outward; also, in other features hereinafter set forth.

In constructing boxes of the class described it is necessary to lap one end of the channel-strip over the other at the place where the two ends join, and so it is desirable to have a portion of one end of the channel-strip of greater width than the other end, in order that it may be quickly and easily placed in position upon the box.

My improved machine provides means for quickly and accurately spreading one end of the channel-strip to adapt it to fit upon its fellow.

The accompanying drawings illustrate my improved machine and its completed product.

Figure 1 is a plan view of the machine. Fig. 2 is a vertical longitudinal mid-section on line $x\ x$, Fig. 1. Fig. 3 is a fragmentary plan view showing the lower portion of one side of the machine. Line $y\ y$, Fig 2, shows the line at which the frame is broken in this view. Fig. 4 is a plain side elevation of the machine. Fig. 5 shows the several guides in cross-section. Fig. 6 shows vertical mid-section of the several channel-formers. Fig. 7 is a vertical cross-section on line $z\ z$, Fig. 1, looking toward the rear of the machine, as indicated by the small arrow. Fig. 8 is a detail of the spreader in side elevation. Fig. 9 is a vertical mid cross-section of the same on line $a\ a$, Fig. 8. Fig. 10 shows the binding-strip as it appears when finished by the machine. Fig. 11 is a view of the spread end of such strip, the same being about the actual size of the ordinary strip. Fig. 12 is an enlarged cross-section of the strip.

My invention consists, essentially, of a channel-strip-forming machine having its rotary shears and formers arranged on the ends of their respective shafts on the outside of the shaft-supporting frame of the machine, in combination with suitable gages and guides arranged to hold the strip in position and to discharge the scrap from the machine and direct the strip through the shears and formers.

It also embraces other features hereinafter more fully set forth.

My improved machine, as illustrated, comprises the combination of a train consisting of the rotary shears A A' and the series of rotary channel formers or rollers B B', C C', D D', and E E', (arranged in pairs graded with increasing depth and decreasing width of channel from the shears at the front of the machine rearwardly,) the spreader-arc F, and the grooved spreader-roller G, arranged in line with the channel-rollers and the withdrawing rollers H H', and operative mechanism connecting the parts of such train.

Suitable intermediate guides I I', J J', K, L, and M M' are arranged to assist in guiding or conducting the strip through the machine.

In order to engage the sides of the strip to prevent lateral or sidewise movements thereof, these guides are arranged as follows: The first guides I I' are provided with flat smooth opposing faces, between which the flat strip of tin is received as it comes from the rotary shears A A', and the scrap shield or guide $q^2$ directs the scrap-tin away from the machine. The second set of guides J J' have their opposing faces conforming to the shape of the tin strip as it passes from the first pair of formers B B'. The third guide K has its upper face provided with a groove conforming to the shape of the outside of the strip as it comes from the formers C C'. The fourth guide L has a groove in its upper face conforming to the shape of the outside of the strip as it comes from the formers D D'. The fifth pair of guides M M' have their opposing faces conforming to the shape of the strip as it comes from the formers E E'. Each guide is arranged to engage and release the strip as near as possible to the contact-faces of the formers in order to prevent the strip from being misdirected, so as to fail to enter between the succeeding set of rotary members, and thus to be prematurely discharged from the machine. It will be seen that the guides which receive the flat strip from the rotary shears and deliver it to the first set of formers and also the guides which receive and deliver the strip from the first set of formers to the second set and from the fourth set of formers to the spreader-roller and spreader-arc are each provided with upper and lower members, between which the tin strip is guided, while the guides K and L each consists of only one member. The reason of this arrangement will be understood by reference to Fig. 5 of the drawings, where it will be seen that the shape of the tin strip as it passes through the guides I I', J J', and M M' is such that it will be easily bent and that at these points a slight variation from a straight line would cause the end of the strip to fail to enter the space between the succeeding set of formers and so cause such strip to be discharged from the machine before it is completed. The shape of the strip as it passes through the guides K and L is such that it is not easily bent or misdirected from its proper course, and one guide is all that is necessary to insure the correct passage of the strip therethrough. These guides K and L are not absolutely necessary, and though omitted the machine may do good work; but their use insures the perfect operation of the machine. No guide is necessary to guide the strip from the spreader devices to the withdrawing-rollers because that part of the strip which is spread is of such shape that it is not easily bent and is of sufficient length to reach the withdrawing-rollers before it is released from the spreaders. After the end of the strip has entered between the withdrawing-rollers there cannot be any bending of the narrow part of the strip which follows, and so a guide at this point is unnecessary. Thus it will be seen that the face of each guide is arranged to conform to the shape of the contact-face of the rotary member which immediately precedes such guide.

The mechanism connecting the parts of the train consists of the driving-shaft N, provided with the pulley O, through which the power is applied, the sprocket-chain Q, which is arranged to drive the sprocket-wheels P' $P^2$, &c., which are fixed upon the shafts N N' $N^2$, &c., which carry one line of the channel-formers, spreader-roller G, and withdrawer, cogwheels R R', &c., mounted upon such shafts N N' $N^2$, &c., and arranged to mesh with cogwheels S S', &c., fixed upon the shafts T T', &c., which carry the other line of shears, formers, and withdrawer, so that the shears, formers, spreader, and withdrawer operate in unison.

V V' $V^2$ are guide-wheels to hold the sprocket-chain in position.

U U' $U^2$ are leading wheels to hold the chain taut.

The guides V V' $V^2$, &c., are each provided with a groove 4, which is of sufficient depth and width to permit the sprockets on the wheel P P', &c., to pass therethrough; but the flanges 5 5 project down upon each side of such sprockets and bear upon the outer upper faces of the edges of the sprocket-chain and so hold the chain firmly down upon the sprocket-wheel. This enables me to operate the entire machine from one straight line of sprocket-chain, which could not otherwise be accomplished.

W is the frame of the machine.

X is the spring-pressed feed-guide, which is pressed against the edge of the sheet-metal strip out of which the binding-strip is formed.

Y is a spring arranged to press the guide X against the strip to hold it in proper position for being fed into the machine.

Z'' is a spring feed-guide arranged to press the tin firmly down upon the table Z in front of the shear members. This prevents the tin from buckling or riding up on the side of the table, and thus causing the binding-strip to be cut of unequal width by the rotary shears.

Z is the feed-table, upon which the strips of tin are laid to be guided into the machine.

In practice the binding-strips are formed of scraps of tin, which are not of uniform width, and when fed into the machine the rotary shears A A' cut the strip to the proper width and pass it on through the opening between the flat-faced guides I I' to the bending-rollers or formers B B', which bend the tin slightly to form an axial channel, and in turn pass the strip on through the opening between the guides J J' to the channeling-rollers C C', D D', and E E', which operate in turn to gradually deepen the channel to the desired form. The guide $q^2$ directs the waste scrap outward from the machine, so that when severed from the channel-strip it falls to the floor or into some suitable receptacle. The channel-strip thus formed is then passed to the spreader F G, and its forward end engages the arc F, which is provided with a thicker edge than the last edged former E and projects down into the path of the strip and into the channel or groove of the spreader-roller G. The spreader-arc F is pivoted on the arbor $b$ and is provided with suitable means—such as the weight C—to normally hold the rear end of the arc in the path of the strip. A stop 8 is arranged to prevent the arc from swinging too far forward. As the strip passes back it causes the arc to rotate until the front end $d$ of the arc passes below the arbor $b$, where it is held by the strip until the strip has passed the spreader, thus allowing the weight to return the arc to the position shown. The result of this is to form the channel $e$ with a widened portion $e'$ at one end of the strip. This enlargement or widened portion $e'$ of the channel serves to allow the insertion of the other end of the same strip or the end of another strip when the same is placed upon the box to bind it, thus forming a neat joint.

In order to form the channel-strip with the burr edge on the inside of the channel, I arrange the shears with the female member A' in the same horizontal plane occupied by the grooved rollers B' C', &c., and the male member A in the same horizontal plane occupied by the insertion or edged rollers B C, &c. By this arrangement the shears turn the burr edge in toward the mid-line of the channel of the strip, so that when the strip is channeled one wall $f$ will be smooth and finished on the outside edge and provided with a burr on the inside edge, so that when the strip is in place on the box the burr will fit against and press into the wall of the box, and thus assist in forming a more perfect union between the binding-strip and the walls of the box than can be otherwise formed.

The several insertion-rollers B, C, D, and E are provided with side stops or shoulders $n$, arranged, respectively, with relation to the edge $v$ of the rollers to serve as stops to engage the edges of the strip being channeled thereby to prevent it from displacement while being channeled—that is to say, the distance from each stop $n$ to the extreme outer point of the insertion-rollers is equal to one-half of the width of the tin strip which is to be channeled by the machine. This causes the edges of the strip to abut against the side stops $n\ n$ and so hold the strip firmly in position. By this means the machine is caused to form the channel with its bottom midway between the edges of the strip.

I provide suitable means for adjusting the shears laterally to compensate for wear. Such means are illustrated in Figs. 1, 4, and 7.

$r$ is a movable journal-piece in which the shaft T of one member of the shears is journaled. Such shaft is provided with the thrust-collars $t\ t'$ to prevent axial movement of the shaft in its bearing.

The movable journal-piece $r$ is secured to the frame W by set-bolts $u$, which bear upon the compressible washers $n'\ n''$, which are arranged to form a slightly-yielding spring to permit slight vertical movement of the male member of the rotary shears to cause the shears to yield slightly to allow slight inequalities in the thickness of the tin to pass therebetween and yet exert sufficient pressure upon the strip to feed it through the machine, and said set-bolts $u$ pass through bolt-holes $v$, which are slightly larger than the set-bolts.

$y$ is a screw parallel with the shaft connecting the journal-piece $r$ and the frame W, so that when the set-bolts $u$ are loosened the journal-piece and its shears-shaft T can be moved transverse of the frame to adjust the shears laterally to compensate for their wear. When the shears are properly adjusted, the journal-piece is fixed in place by tightening the set-bolts $u$.

$q$ is an antifriction-roller arranged to engage the tin opposite the point where the shears engage the strip, so as to relieve the friction of the strip as it is passed into the machine.

Now, having described my invention, what I claim as new, and desire to secure by Letters Patent, is—

1. In a machine for forming channel-strips for berry-boxes, the combination of the train comprising the rotary shears and a series of rotary channel-formers arranged in pairs graded with increasing depth and decreasing width of channel from the shears rearwardly, and suitable guides arranged to guide the strip from the shears to the formers and from one set of formers to another and having the face of each guide conforming to the shape of the contact-face of the rotary member immediately preceding such guide.

2. The combination of the frame of the machine, the shears, and former-shafts, the rotary shears and formers arranged on the ends of their respective shafts on the outside of the shaft-supporting frame, and suitable gages and guides arranged to hold the strip in position and to discharge the scrap from the machine.

3. The machine for forming channel-strips, comprising the combination of a train consisting of the rotary shears and the series of rotary channel-formers arranged in pairs graded with increasing depth and decreasing width of channel from the shears rearwardly, the spreader-arc, the grooved spreader-roller, and the withdrawing-rollers, and operative mechanism connecting the parts of the train.

4. In a machine for forming channel-strips, the combination of a train of channel-forming rollers, the grooved spreader-roller arranged in line with the channel-rollers, and the spreader-arc arranged to project into the groove of the spreader-roller and into the path of the strip, and operative mechanism connecting the parts of the train.

5. The combination of the frame, the shaft provided with one member of the shears and journaled in the movable journal-piece, so as to prevent axial movement of such shaft in its bearing, such movable journal-piece secured to the frame by set-bolts which pass through bolt-holes in the frame, which are slightly larger than the set-bolts, and the screw parallel with the shaft connecting the journal-piece and the frame, so that when the set-bolts are loosened the journal-piece and its shears-shaft can be moved transverse of the frame to adjust the shears laterally to compensate for their wear.

6. In a machine for forming channel-strips, the combination of the feed-table, the spring feed-guide arranged to press against the edge of the strip, the rotary shears, and the anti-friction-roller arranged opposite the spring feed-guide to engage the edge of the strip as the strip passes into the machine.

7. In a machine for forming channel-strips for berry-boxes, the combination of the train comprising the rotary shears and a series of rotary channel-formers arranged in pairs graded with increasing depth of channel from the shears rearwardly, and suitable guides arranged to engage the sides of the strip to prevent lateral or sidewise movement of the strip when passing through the machine.

8. In a machine for forming channel-strips for berry-boxes, the combination of the power-shaft, the series of sprocket-wheels arranged upon one line of channel-former-carrying shafts, the sprocket-chain arranged upon such wheels, the sprocket-chain guide-wheels arranged upon the other line of channel-former-carrying shafts and each provided with a groove of sufficient width and depth to permit the sprockets on the sprocket-wheels to pass therethrough and having their flanges arranged to project down upon each side of such sprockets and bear upon the outer upper faces of the sprocket-chain and so hold the chain firmly down upon the sprocket-wheels, and the leading wheels arranged to hold the chain taut.

9. In a machine for forming channel-strips, the combination of the train comprising a series of rotary channel-formers graded and arranged in pairs with increasing depth and decreasing width of channel from the front end of the machine rearwardly, and suitable means arranged toward the end of the train to widen a portion of one end of the channel of the strip after the channel is formed.

10. In a machine for forming channel-strips, the combination of the train comprising the rotary shears and the series of rotary channel-formers graded and arranged in pairs with increasing depth and decreasing width of channel from the front end of the machine rearwardly, and suitable means arranged toward the rear of the train to widen a portion of one end of the channel of the strip after the channel is formed.

11. In a machine for forming channel-strips, the combination of the train comprising the rotary shears and a series of rotary channel-formers graded and arranged in pairs with increasing depth and decreasing width of channel from the front end of the machine rearwardly, the guides arranged between the rotary shears and the first set of formers and provided with flat smooth opposing faces between which the strip of tin is received as it comes from the rotary shears, and the scrap shield or guide arranged to direct the scrap away from the machine.

12. In a machine for forming channel-strips, the combination of the train comprising the rotary shears and the series of rotary channel-formers graded and arranged in pairs with increasing depth and decreasing width of channel from the front end of the machine rearwardly and having the insertion-rollers provided with side stops arranged at a distance from the extreme outer edge of the insertion-roller equal to one-half of the width of the strip to be channeled.

JOHN G. LETTELIER.

Witnesses:
JAMES R. TOWNSEND,
ALFRED I. TOWNSEND.